May 21, 1957 P. A. FRYDA 2,792,584
SCRAPER HAVING A DETACHABLE BLADE
Filed Aug. 11, 1952
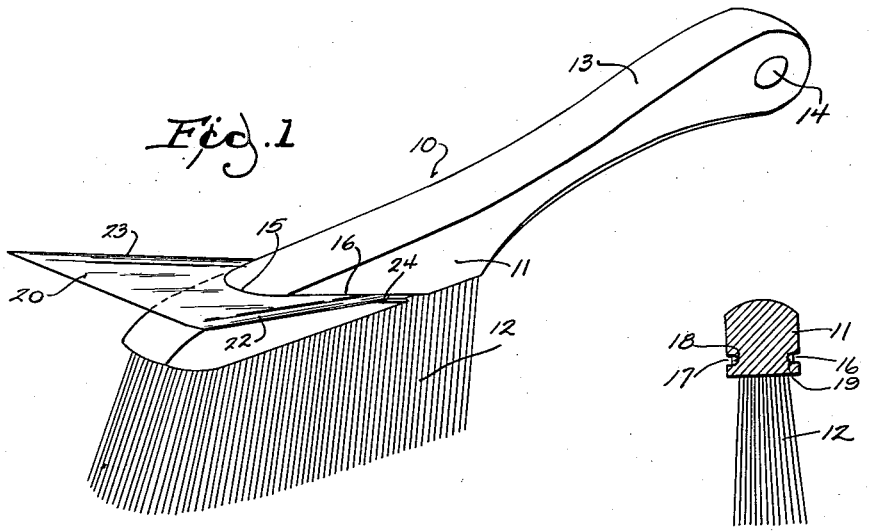
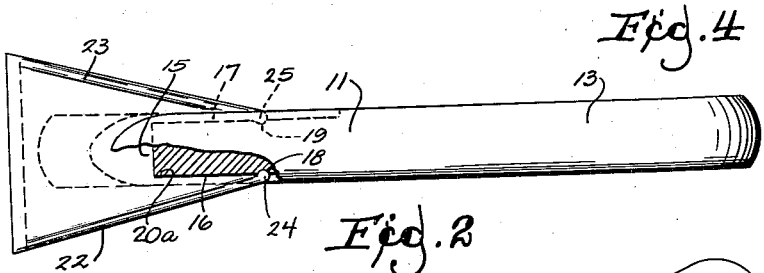
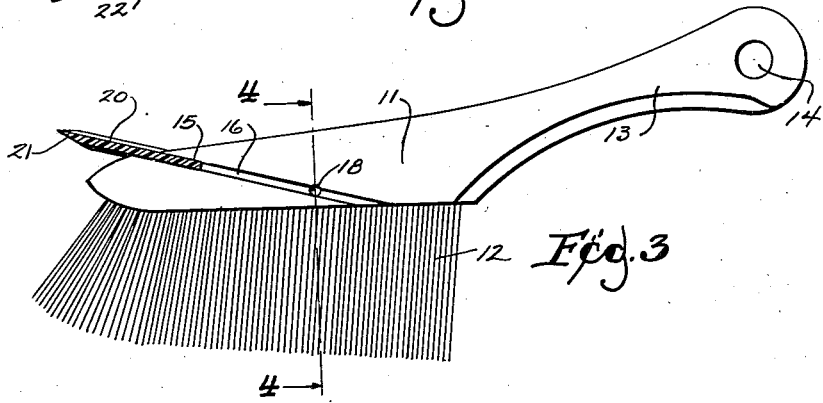
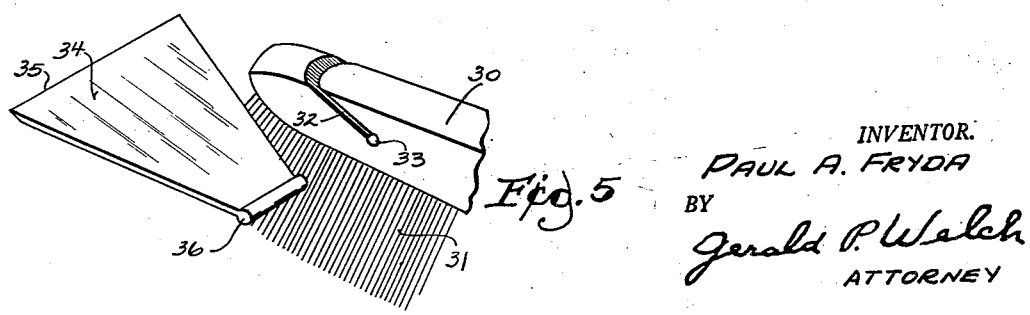
INVENTOR.
PAUL A. FRYDA
BY
Gerald P. Welch
ATTORNEY United States Patent Office 2,792,584
Patented May 21, 1957

2,792,584
SCRAPER HAVING A DETACHABLE BLADE

Paul A. Fryda, Milwaukee, Wis., assignor to Industries for the Blind, Inc., Milwaukee, Wis.

Application August 11, 1952, Serial No. 303,755

2 Claims. (Cl. 15—236)

This invention relates to improvements in a scraper, and more particularly to a novel scraper adapted for use in cleaning snow and ice from an automobile windshield and for other purposes.

Another object of the invention is to provide a device of the type having an efficient scraper blade releasably held at a convenient angle in a back.

Other and further objects of the invention will appear as the description proceeds, reference being had to the accompanying drawings, in which:

Fig. 1 is a view in perspective of a whisk brush and scraper combination.

Fig. 2 is a plan view thereof partially broken away.

Fig. 3 is a side view of the device, the scraper blade being broken away and shown in section.

Fig. 4 is a vertical sectional view taken on line 4—4 of Fig. 3.

Fig. 5 is a broken away and exploded view of a modified form of the invention.

Referring more particularly to the drawings, the numeral 10 refers to the device generally, having a brush head 11 provided with a plurality of bristles 12. The brush head 11 has an integral handle 13 disposed at an obtuse angle thereto and provided with an eye opening at 14 thereof.

The brush head 11 is provided with an oblique frontal slot at 15 thereof communicating and on a plane with the lateral slots 16 and 17 which terminate at their inner ends in the depressions at 18 and 19.

A blade 20 has an elongated rectangular cut-out portion at 20a and a beveled scraping edge at 21 and the beaded side edges 22 and 23 by way of reinforcement, and may be formed of plastic or other suitable material. The side edges 22 and 23 terminate at their inner ends in the rounded enlargements 24 and 25 adapted to engage within the depressions at 18 and 19 when the blade 20 is fully inserted in place.

In Fig. 5 is shown a modified form of the invention, in which a brush head 30 has the bristles 31 and the oblique transverse slot at 32 terminating at its inner end at 33 in a transverse round bore. A modified form of blade 34 has a scraper edge at 35 and a round bead 36 at its inner end adapted to slide into the bore at 33 with a sliding fit.

In use, the brush 10 may be used as a whisk brush for ordinary purposes and in the form shown is very useful for removing snow from automobile windshields or windows. The blade 20 may be kept separate until it is desired for use, whereupon it may be inserted in and over the end of the brush head 11 within the slots 15, 16 and 17. The enlargements 24 and 25 will retain the blade against accidental displacement during use and the blade edge 21 may be employed in removing ice and snow from a windshield.

It will be understood that the device is capable of many modifications in structure and design, without departing from the spirit of the invention, within the scope of the appended claims.

Having thus described the invention, what is claimed and desired to be secured by Letters Patent of the United States, is:

1. A scraper for cleaning ice and snow from smooth surfaces comprising a handle having an upper surface and two side walls, a pair of shallow slots extending along said side walls of said handle at an acute angle to and intersecting said upper surface of said handle, a third slot extending across said upper surface transverse to and intersecting said pair of slots, said pair of slots having depressions of increased depth at the ends of said slots of said pair remote from said third slot, and a rigid scraper blade detachably mounted on said handle, said blade having a forward scraper edge substantially parallel to said third slot, rearwardly extending, beaded, side edges that slope inwardly from the outer ends of said scraper edge, and a recess in its rear edge, the side walls of said recess terminating at their rear ends in enlargements and being spaced apart approximately the same distance as the bottoms of the slots of said pair of slots so that the portions of the scraper blade adjacent thereto may enter such slots, said side walls of said recess being of such lengths that said enlargements may enter said depressions and the front wall of said recess in the blade fits within said third slot in said handle.

2. A scraper comprising a handle having an upper surface and two side walls, a pair of slots extending along said side walls of said handle at a predetermined angle inclined to and intersecting said upper surface, a third slot extending across said upper surface and intersecting said pair of slots, said pair of slots having depressions of increased depth adjacent the ends of said slots of said pair remote from said third slot, and a scraper blade detachably mounted on said handle, said blade having a scraper edge, rearwardly extending beaded side edges that slope inwardly from the outer ends of said scraper edge, and a recessed edge remote from said scraper edge, the side walls of said recess terminating in enlargements and being spaced apart approximately the same distance as the bottom walls of the slots of said pair of slots so that the portions of the side walls of said blade defined by said recess may enter said slots, said side walls of said recess being of such length that said enlargements may enter said depressions and the front wall of said recess is seated in said third slot in said handle.

References Cited in the file of this patent

UNITED STATES PATENTS

| D. 170,460 | Hauser | Sept. 22, 1953 |
| 36,309 | Schweizer et al. | Aug. 26, 1862 |
| 151,630 | Stamp | June 2, 1874 |
| 214,548 | Bovey | Apr. 22, 1879 |
| 556,722 | Ford | Mar. 17, 1896 |
| 688,160 | Clarke | Dec. 3, 1901 |
| 1,581,943 | Bunker | Apr. 20, 1926 |
| 1,676,857 | Cheron | July 10, 1928 |
| 1,760,268 | Cave | May 27, 1930 |
| 2,207,651 | Batchelder | July 9, 1940 |
| 2,212,197 | Roesch et al. | Aug. 20, 1940 |
| 2,618,005 | Harshbarger | Nov. 18, 1952 |
| 2,676,348 | Brody et al. | Apr. 27, 1954 |

FOREIGN PATENTS

| 10,112 | Great Britain | June 20, 1889 |
| 15,932 | Great Britain | 1912 |
| 105,493 | Australia | Oct. 27, 1938 |
| 243,732 | Switzerland | Feb. 1, 1947 |
| 496,131 | Belgium | Oct. 2, 1950 |